US012051377B2

(12) United States Patent
Park et al.

(10) Patent No.: US 12,051,377 B2
(45) Date of Patent: Jul. 30, 2024

(54) DISPLAY APPARATUS AND METHOD OF COMPENSATING DETERIORATION OF DISPLAY PANEL USING THE SAME

(71) Applicant: Samsung Display Co., LTD., Yongin-si (KR)

(72) Inventors: Jong-Woong Park, Yongin-si (KR); Wonju Shin, Yongin-si (KR); Byung Ki Chun, Yongin-si (KR); Kanghee Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/354,241

(22) Filed: Jul. 18, 2023

(65) Prior Publication Data

US 2024/0105127 A1 Mar. 28, 2024

(30) Foreign Application Priority Data

Sep. 23, 2022 (KR) ........................ 10-2022-0121170

(51) Int. Cl.
*G09G 3/3291* (2016.01)
*G09G 3/20* (2006.01)

(52) U.S. Cl.
CPC ......... *G09G 3/3291* (2013.01); *G09G 3/2007* (2013.01); *G09G 3/2096* (2013.01);
(Continued)

(58) Field of Classification Search
CPC ............... G09G 3/2007; G09G 3/2096; G09G 3/32–3291; G09G 2310/027;
(Continued)

(56) References Cited

U.S. PATENT DOCUMENTS

2006/0279490 A1 12/2006 Park et al.
2016/0155382 A1* 6/2016 Cheon ................. G09G 3/3258 345/76

(Continued)

FOREIGN PATENT DOCUMENTS

CN 100587779 2/2010
CN 106469541 A * 3/2017 ............ G09G 3/006

(Continued)

OTHER PUBLICATIONS

English translation of CN-106469541-A (Year: 2017).*
English translation of KR-20150101506-A (Year: 2015).*

*Primary Examiner* — Nathan Danielsen
(74) *Attorney, Agent, or Firm* — KILE PARK REED & HOUTTEMAN PLLC

(57) ABSTRACT

A display apparatus includes a display panel, a driving controller, and a data driver. The driving controller generates a data signal based on input image data. The data driver converts the data signal into a data voltage and outputs the data voltage to the display panel. The driving controller includes a deterioration compensator. The deterioration compensator generates an alpha value based on a ratio between a sensed current read from a portion of the display panel applied with a high power voltage or a portion of the display panel applied with a low power voltage and a predicted current calculated from the input image data and generates the data signal using the input image data, a stress value of a pixel, and the alpha value.

20 Claims, 8 Drawing Sheets

(52) U.S. Cl.
CPC . *G09G 2320/045* (2013.01); *G09G 2330/021* (2013.01); *G09G 2330/028* (2013.01); *G09G 2330/12* (2013.01); *G09G 2360/12* (2013.01); *G09G 2360/16* (2013.01)

(58) Field of Classification Search
CPC ....... G09G 2310/0289; G09G 2320/04; G09G 2320/043–048; G09G 2320/0686; G09G 2320/0673; G09G 2320/0693; G09G 2330/021; G09G 2330/028; G09G 2330/12; G09G 2360/12; G09G 2360/16
See application file for complete search history.

(56) References Cited

U.S. PATENT DOCUMENTS

| | | | | |
|---|---|---|---|---|
| 2017/0084227 | A1* | 3/2017 | Bae | G09G 3/3225 |
| 2018/0061321 | A1* | 3/2018 | Hong | G09G 3/3241 |
| 2019/0164503 | A1* | 5/2019 | An | G09G 3/3291 |
| 2020/0143769 | A1* | 5/2020 | An | G09G 5/18 |
| 2020/0251045 | A1* | 8/2020 | An | G09G 3/32 |
| 2020/0365091 | A1* | 11/2020 | Pyun | G09G 3/3283 |

FOREIGN PATENT DOCUMENTS

| | | | | |
|---|---|---|---|---|
| KR | 10-2015-0101506 | | 9/2015 | |
| KR | 20150101506 | A * | 9/2015 | G09G 3/3233 |
| KR | 10-2018-0009407 | | 1/2018 | |
| KR | 10-2021-0065283 | | 6/2021 | |

* cited by examiner

DISPLAY APPARATUS AND METHOD OF COMPENSATING DETERIORATION OF DISPLAY PANEL USING THE SAME

CROSS-REFERENCE TO RELATED APPLICATION(S)

This application claims priority to and benefits of Korean Patent Application No. 10-2022-0121170 under 35 U.S.C. § 119, filed on Sep. 23, 2022, in the Korean Intellectual Property Office (KIPO), the entire contents of which are incorporated herein by reference.

BACKGROUND

1. Technical Field

Embodiments of the disclosure relate to a display apparatus reducing a power consumption and enhancing a display quality by precisely setting a power voltage and a method of compensating a deterioration of a display panel using the display apparatus.

2. Description of the Related Art

Generally, a display apparatus includes a display panel and a display panel driver. The display panel includes gate lines, data lines and pixels. The display panel driver includes a gate driver and a data driver. The gate driver outputs gate signals to the gate lines. The data driver outputs data voltages to the data lines. The display panel driver further includes a sensing part receiving a sensing signal from the pixel. The display panel driver further includes a power voltage generator outputting a power voltage to the display panel. The display panel driver further includes a driving controller controlling an operation of the gate driver, an operation of the data driver and an operation of the power voltage generator.

The driving controller may include a deterioration compensator compensating a deterioration of a display panel. In a conventional method, an accuracy of deterioration compensation may decrease due to deterioration compensation errors due to a variation between cells.

SUMMARY

Embodiments of the disclosure provide a display apparatus enhancing an accuracy of a deterioration compensation and a display quality of a display panel by compensating a deterioration of the display panel using a ratio between a sensed current of the display panel and a predicted current of the display panel predicted based on input image data.

Embodiments of the disclosure also provide a method of compensating a deterioration of a display panel using the display apparatus.

In an embodiment of the disclosure, the display apparatus may include a display panel, a driving controller that generates a data signal based on input image data, and a data driver that converts the data signal into a data voltage and outputs the data voltage to the display panel. The driving controller may include a deterioration compensator. The deterioration compensator may generate an alpha value based on a ratio between a sensed current read from a portion of the display panel applied with a high power voltage or a portion of the display panel applied with a low power voltage and a predicted current calculated from the input image data and generate the data signal using the input image data, a stress value of a pixel, and the alpha value.

In an embodiment, the driving controller may further include a memory controller that outputs the stress value to the deterioration compensator, and a stress converter that calculates the stress value based on at least one of a display luminance, a temperature, a current, and a voltage of the display panel.

In an embodiment, the driving controller may further include a volatile memory that accumulates the stress value calculated by the stress converter and stores the stress value.

In an embodiment, the display apparatus may further include a nonvolatile memory that accumulates the stress value calculated by the stress converter and stores the stress value.

In an embodiment, the deterioration compensator may include an input current calculator that receives the input image data and generates the predicted current based on the input image data. The predicted current may correspond to an entire area of the display panel.

In an embodiment, in case that a red grayscale value of the input image data is R_d_i, a green grayscale value of the input image data is G_d_i, a blue grayscale value of the input image data is B_d_i, a red conversion function converting the red grayscale value to a red luminance is R_Gam, a green conversion function converting the green grayscale value to a green luminance is G_Gam, a blue conversion function converting the blue grayscale value to a blue luminance is B_Gam, a first coefficient converting the red luminance to a first current is Kr, a second coefficient converting the green luminance to a second current is Kg, a third coefficient converting the blue luminance to a third current is Kb, and the predicted current is ISUM, ISUM=SUM(Kr*R_Gam[R_d_i]+Kg*G_Gam[G_d_i]+Kb*B_Gam[B_d_i]) may be satisfied.

In an embodiment, the deterioration compensator may further include a reference current calculator that receives the sensed current and generates a reference current based on the sensed current. The reference current may correspond to the entire area of the display panel.

In an embodiment, in case that the sensed current is TREAD, the reference current is IMEASURE, and a fitting constant is K_read, IMEASURE=K_read*IREAD may be satisfied.

In an embodiment, the deterioration compensator may further include a current compensating value calculator that receives the predicted current and the reference current and generates the alpha value based on a ratio between the predicted current and the reference current.

In an embodiment, in case that the reference current is IMEASURE, the predicted current is ISUM, a current compensating value lookup table is K_alpha_LUT, and the alpha value is ALPHA, ALPHA=K_alpha_LUT(IMEASURE/ISUM) may be satisfied.

In an embodiment, the deterioration compensator may further include a compensation applier that receives the stress value of the pixel and the alpha value, generates a luminance compensating value of the pixel, and applies the luminance compensating value to the input image data to generate the data signal.

In an embodiment, in case that the alpha value is ALPHA, a red stress value is A_r_i, a green stress value is A_g_i, a blue stress value is A_b_i, a red luminance compensating value is Lr_comp_i, a green luminance compensating value is Lg_comp_i, a blue luminance compensating value is Lb_comp_i, a red luminance compensating lookup table is Lr_drop_LUT, a green luminance compensating lookup table is Lg_drop_LUT, and a blue luminance compensating lookup table is Lb_drop_LUT, Lr_comp_i=Lr_drop_LUT(A_r_i*ALPHA) may be satisfied, Lg_comp_i=Lg_drop_LUT(A_g_i*ALPHA) may be satisfied, and Lb_comp_i=Lb_drop_LUT(A_b_i*ALPHA) may be satisfied.

In an embodiment, in case that a red grayscale value of the input image data is R_d_i, a green grayscale value of the input image data is G_d_i, a blue grayscale value of the input image data is B_d_i, a red grayscale value of the data signal is comp_data_r, a green grayscale value of the data signal is comp_data_g, a blue grayscale value of the data signal is comp_data_b, a red luminance-grayscale converting coefficient is scale_r, a green luminance-grayscale converting coefficient is scale_g, and a blue luminance-grayscale converting coefficient is scale_b, comp_data_r=Lr_comp_i*R_d_i*scale_r may be satisfied, comp_data_g=Lg_comp_i*G_d_i*scale_g may be satisfied, and comp_data_b=Lb_comp_i*B_d_i*scale_b may be satisfied.

In an embodiment, the deterioration compensator may further include a current compensating value calculator that receives the predicted current and the sensed current and generates the alpha value based on the ratio between the predicted current and the sensed current.

In an embodiment, the display apparatus may further include a power voltage generator that outputs the high power voltage and the low power voltage to the display panel, and a readout circuit that reads the sensed current from the portion of the display panel applied with the low power voltage.

In an embodiment, the display apparatus may further include a power voltage generator that outputs the high power voltage and the low power voltage to the display panel, a readout circuit that reads a sensing source current from the portion of the display panel applied with the low power voltage, and a low pass filter that periodically samples the sensing source current and operates a low pass filtering of the sensing source current to generate the sensed current.

In an embodiment, the display apparatus may further include a power voltage generator that outputs the high power voltage and the low power voltage to the display panel, and a readout circuit that reads the sensed current from the portion of the display panel applied with the high power voltage.

In an embodiment, the display apparatus may further include a power voltage generator that outputs the high power voltage and the low power voltage to the display panel, a readout circuit that reads a sensing source current from the portion of the display panel applied with the high power voltage, and a low pass filter that periodically samples the sensing source current and operates a low pass filtering of the sensing source current to generate the sensed current.

In an embodiment, as a deterioration rate of the display panel increases, an operation cycle of the deterioration compensator may decrease.

In an embodiment of the disclosure, a method of compensating a deterioration of a display panel may include calculating a stress value of the display panel based on at least one of a display luminance, a temperature, a current, and a voltage of the display panel, generating a predicted current corresponding to an entire area of the display panel based on input image data, reading a sensed current from a portion of the display panel applied with a high power voltage or a portion of the display panel applied with a low power voltage, generating an alpha value based on a ratio between the sensed current and the predicted current and generating a data signal using the input image data, the stress value and the alpha value.

According to the display apparatus and the method of compensating the deterioration of the display panel, the deterioration of the display panel may be compensated using the ratio between the sensed current of the display panel and the predicted current of the display panel predicted based on the input image data so that the deterioration compensation error due to the variation between the cells may be reduced.

Thus, the accuracy of the deterioration compensation may be enhanced, and the display quality of the display panel may be enhanced.

BRIEF DESCRIPTION OF THE DRAWINGS

The above and other features and advantages of the disclosure will become more apparent by describing in detailed embodiments thereof with reference to the accompanying drawings, in which.

DETAILED DESCRIPTION OF THE EMBODIMENTS

Figure 1:
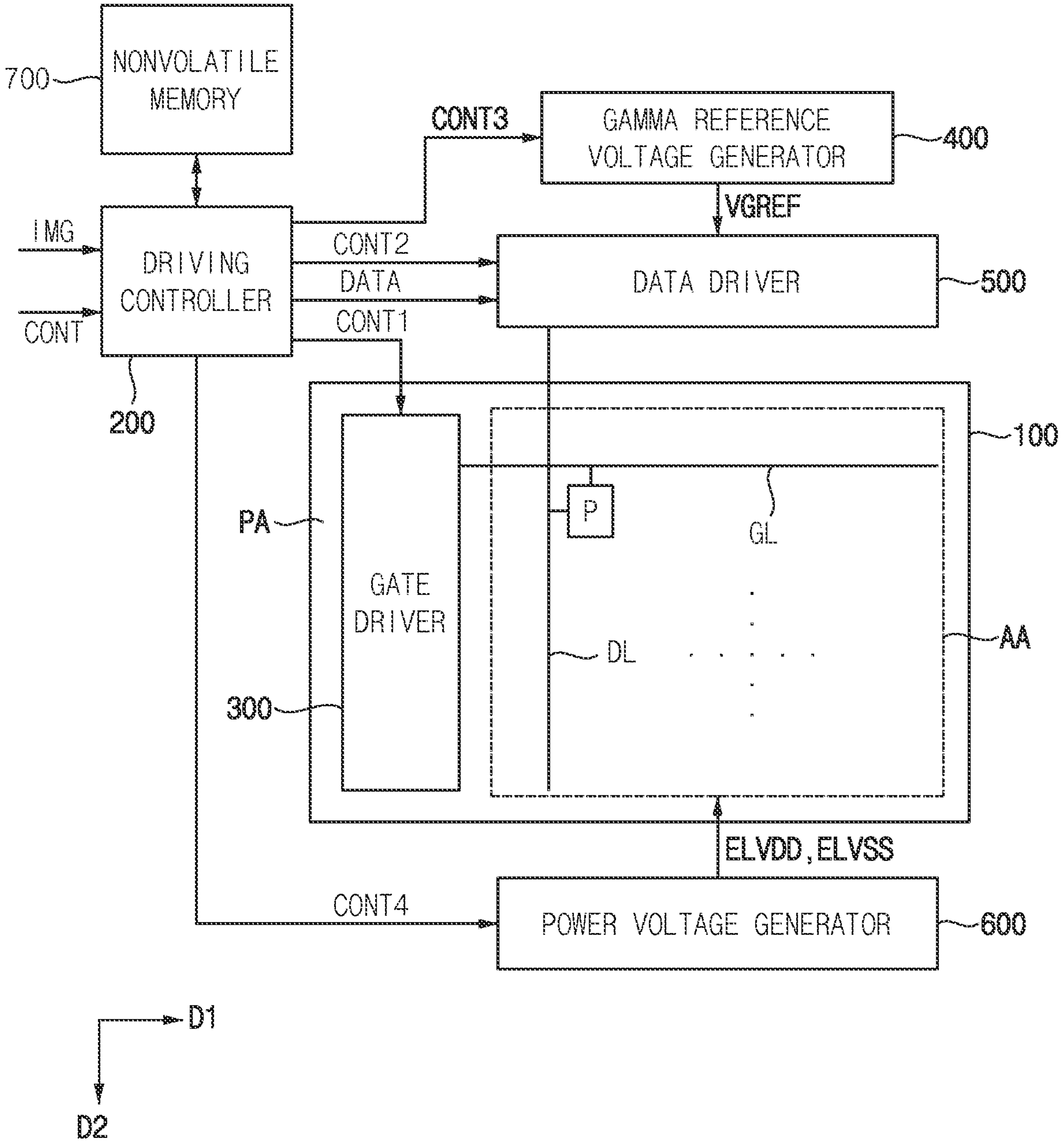
FIG. 1 is a schematic block diagram illustrating a display apparatus according to an embodiment of the disclosure.

Hereinafter, the disclosure will be explained in detail with reference to the accompanying drawings.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms “substantially,” “about,” and other similar terms, are used as terms of approximation and not as terms of degree, and, as such, are utilized to account for inherent deviations in measured, calculated, and/or provided values that would be recognized by one of ordinary skill in the art.

For the purposes of this disclosure, “at least one of A and B” may be construed as A only, B only, or any combination of A and B. Also, “at least one of X, Y, and Z” and “at least one selected from the group consisting of X, Y, and Z” may be construed as X only, Y only, Z only, or any combination of two or more of X, Y, and Z. In the specification and the claims, the term “and/or” is intended to include any combination of the terms “and” and “or” for the purpose of its meaning and interpretation. For example, “A and/or B” may be understood to mean “A, B, or A and B.” The terms “and” and “or” may be used in the conjunctive or disjunctive sense and may be understood to be equivalent to “and/or.”

When an element, such as a layer, is referred to as being “on,” “connected to,” or “coupled to” another element or layer, it may be directly on, connected to, or coupled to the other element or layer or intervening elements or layers may be present. When, however, an element or layer is referred to as being “directly on,” “directly connected to,” or “directly coupled to” another element or layer, there are no intervening elements or layers present. To this end, the term “connected” may refer to physical, electrical, and/or fluid connection, with or without intervening elements.

Further, the first direction D1, the second direction D2, and the third direction D3 are not limited to three axes of a rectangular coordinate system, such as the x, y, and z axes, and may be interpreted in a broader sense. For example, the first direction D1, the second direction D2, and the third direction D3 may be perpendicular to one another, or may represent different directions that are not perpendicular to one another.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

FIG. 1 is a schematic block diagram illustrating a display apparatus according to an embodiment of the disclosure.

Referring to FIG. 1, the display apparatus may include a display panel 100 and a display panel driver. The display panel driver may include a driving controller 200, a gate driver 300, a gamma reference voltage generator 400, and a data driver 500. The display panel driver may further include a power voltage generator 600. The display apparatus may further include a nonvolatile memory 700.

In an embodiment, the driving controller 200 and the data driver 500 may be integral with each other. In an embodiment, the driving controller 200, the gamma reference voltage generator 400, and the data driver 500 may be integral with each other. In an embodiment, the driving controller 200, the gamma reference voltage generator 400, the data driver 500, and the power voltage generator 600 may be integral with each other. A driving module including at least the driving controller 200 and the data driver 500 which are integrally formed may be called a timing controller embedded data driver (TED).

The display panel 100 may have a display region AA on which an image is displayed and a peripheral region PA adjacent to the display region AA.

In an embodiment, the display panel 100 may be an organic light emitting diode display panel including an organic light emitting diode. In an embodiment, the display panel 100 may be a quantum dot organic light emitting diode display panel including an organic light emitting diode and a quantum dot color filter. In an embodiment, the display panel 100 may be a quantum dot nano light emitting diode display panel including a nano light emitting diode and a quantum dot color filter.

The display panel 100 may include multiple gate lines GL, multiple data lines DL, and multiple pixels P connected to the gate lines GL and the data lines DL. The gate lines GL may extend in a first direction D1, and the data lines DL may extend in a second direction D2 intersecting the first direction D1.

The driving controller 200 may receive input image data IMG and an input control signal CONT from an external apparatus (e.g. a host or an application processor). The input image data IMG may include red image data, green image data, and blue image data. The input image data IMG may include white image data. The input image data IMG may include magenta image data, yellow image data, and cyan image data. The input control signal CONT may include a master clock signal and a data enable signal. The input control signal CONT may further include a vertical synchronizing signal and a horizontal synchronizing signal.

The driving controller 200 may generate a first control signal CONT1, a second control signal CONT2, a third control signal CONT3, and a data signal DATA based on the input image data IMG and the input control signal CONT.

The driving controller 200 may generate the first control signal CONT1 for controlling an operation of the gate driver 300 based on the input control signal CONT, and output the first control signal CONT1 to the gate driver 300. The first control signal CONT1 may further include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and output the third control signal CONT3 to the gamma reference voltage generator 400.

The driving controller 200 may generate a fourth control signal CONT4 for controlling an operation of the power voltage generator 600 based on the input image data IMG and the input control signal CONT, and output the fourth control signal CONT4 to the power voltage generator 600.

The gate driver 300 may generate gate signals in response to the first control signal CONT1 received from the driving controller 200. The gate driver 300 may output the gate signals to the gate lines GL. For example, the gate driver 300 may sequentially output the gate signals to the gate lines GL.

In an embodiment, the gate driver 300 may be arranged in the peripheral region PA of the display panel 100.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may be used to convert the data signal DATA to the data voltage having an analog type.

In an embodiment, the gamma reference voltage generator 400 may be disposed in the driving controller 200, or in the data driver 500.

The data driver 500 may receive the second control signal CONT2 and the data signal DATA from the driving controller 200, and receive the gamma reference voltages VGREF from the gamma reference voltage generator 400. The data driver 500 may convert the data signal DATA into data voltages having an analog type using the gamma reference voltages VGREF. The data driver 500 may output the data voltages to the data lines DL.

The power voltage generator 600 may generate a high power voltage ELVDD and output the high power voltage ELVDD to the display panel 100. The power voltage generator 600 may generate a low power voltage ELVSS and output the low power voltage ELVSS to the display panel 100. The power voltage generator 600 may generate a gate driving voltage for driving the gate driver 300 and output the gate driving voltage to the gate driver 300. The power voltage generator 600 may generate a data driving voltage for driving the data driver 500 and output the data driving voltage to the data driver 500. For example, the high power voltage ELVDD may be a high power voltage applied to the pixel P of the display panel 100 and the low power voltage ELVSS may be a low power voltage applied to the pixel P of the display panel 100.

The nonvolatile memory 700 may store stress values of the pixels P of the display panel 100. The stress value may include a deterioration degree of the pixel P, and the stress value may be stored in the nonvolatile memory 700 so as not to be erased even in case that the display apparatus is turned off.

Figure 2:
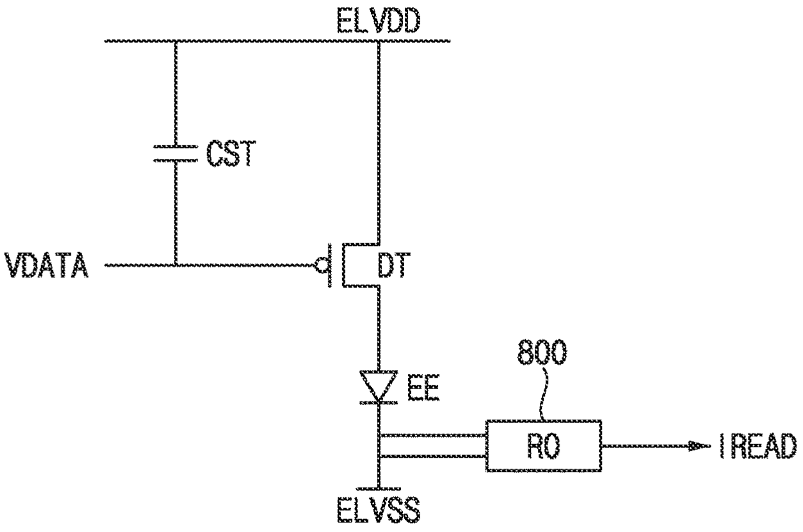
FIG. 2 is a schematic diagram of an equivalent circuit of a display panel of FIG. 1 and a readout circuit.
Figure 3:
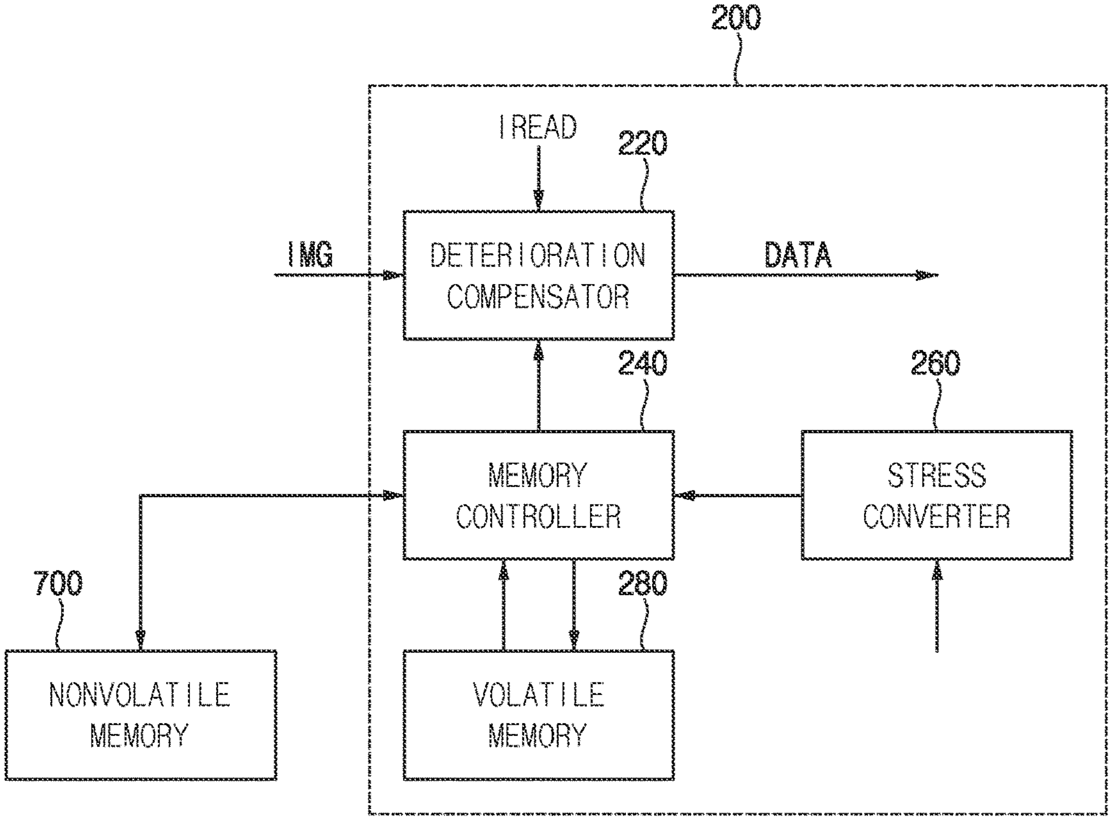
FIG. 3 is a schematic block diagram illustrating a driving controller and a nonvolatile memory of FIG. 1.
Figure 4:
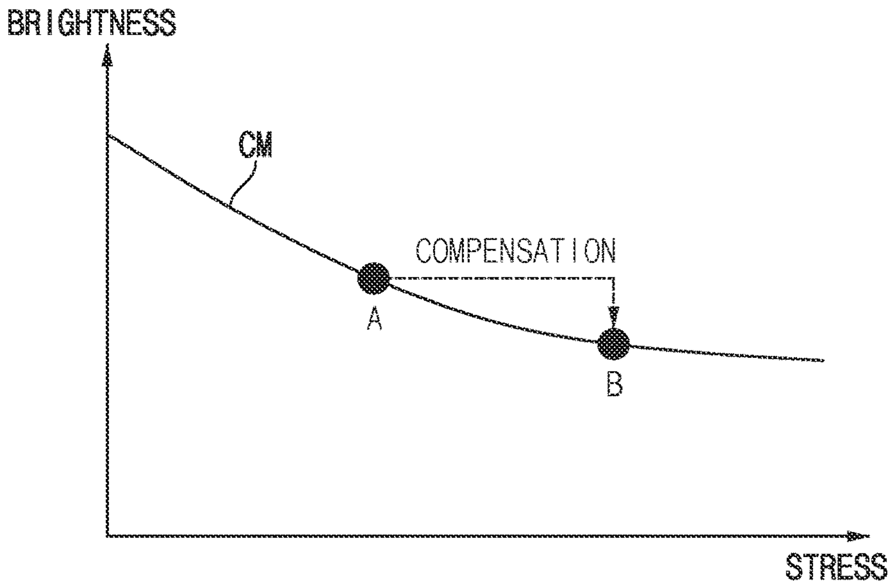
FIG. 4 is a graph illustrating an example of an operation of a deterioration compensator of FIG. 3.
Figure 5:
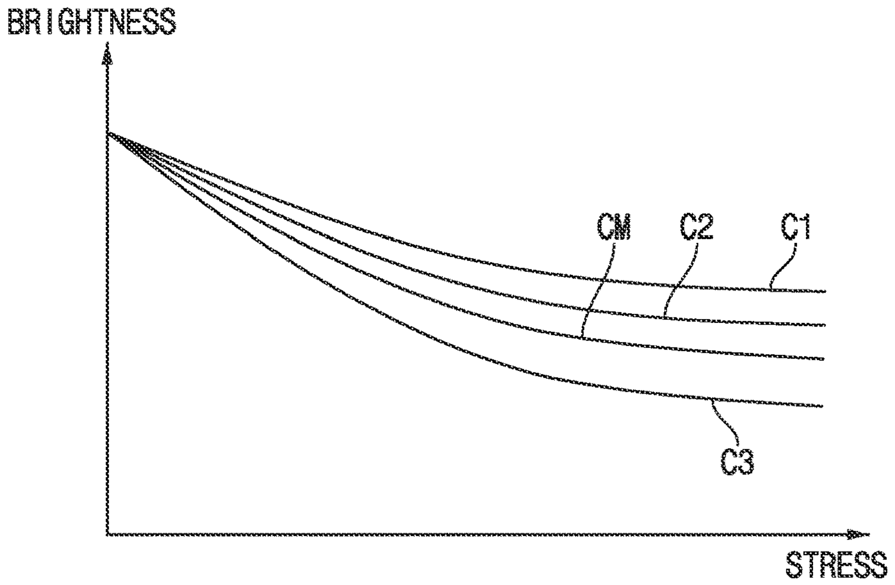
FIG. 5 is a graph illustrating an operation of the deterioration compensator of FIG. 3 and an example of a compensation difference between cells.
Figure 6:
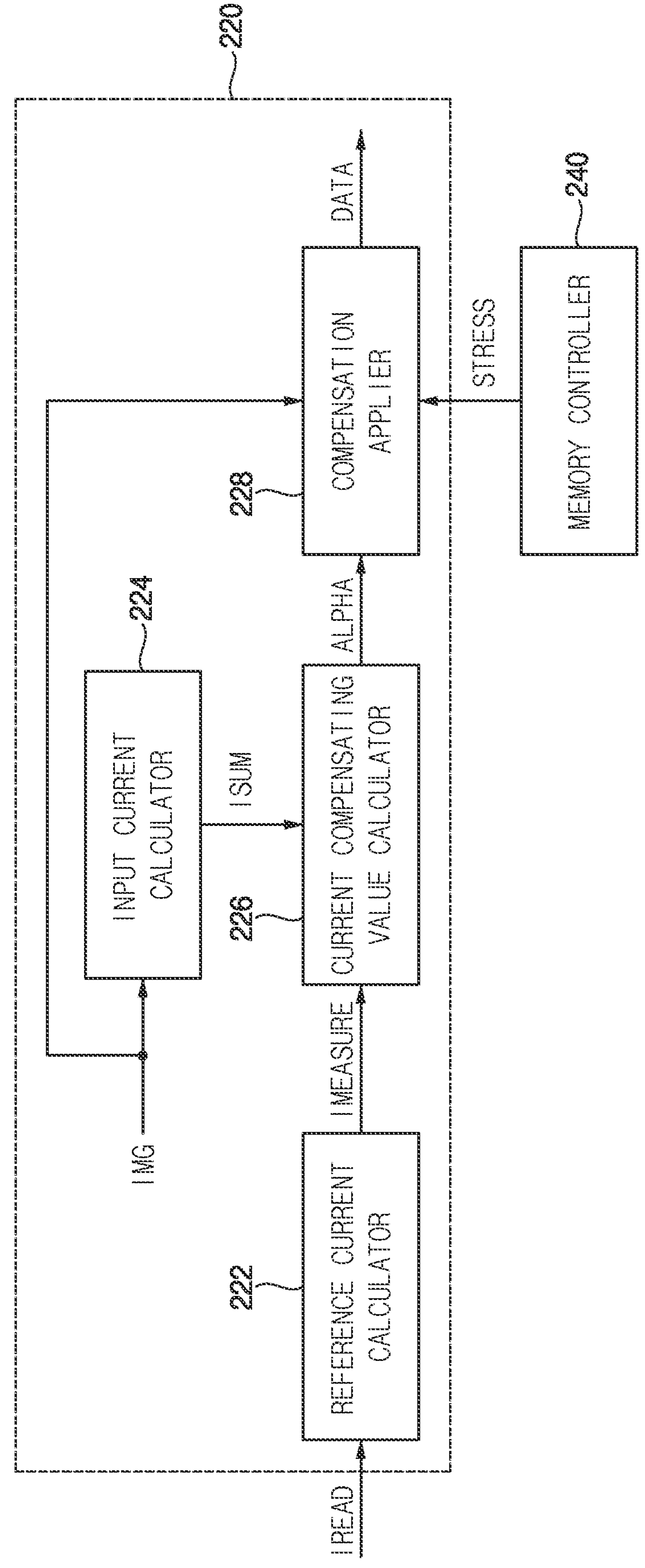
FIG. 6 is a schematic diagram of an equivalent circuit of the deterioration compensator and a memory controller of FIG. 3.

FIG. 2 is a schematic diagram of an equivalent circuit of the display panel 100 of FIG. 1 and a readout circuit 800. FIG. 3 is a schematic block diagram illustrating the driving controller 200 and the nonvolatile memory 700 of FIG. 1. FIG. 4 is a graph illustrating an example of an operation of a deterioration compensator 220 of FIG. 3. FIG. 5 is a graph illustrating an operation of the deterioration compensator 220 of FIG. 3 and an example of a compensation difference between cells. FIG. 6 is a schematic diagram of an equivalent circuit of the deterioration compensator 220 and a memory controller 240 of FIG. 3.

Referring to FIGS. 1 to 6, the driving controller 200 may include the deterioration compensator 220. The deterioration compensator 220 may generate the data signal DATA compensating the deterioration of the display panel 100. For example, in case that a specific area of the display panel 100 displays a brighter image than a desired image due to the deterioration, the deterioration compensator 220 may adjust the data signal DATA to be darker so that the specific area may display the desired image.

The deterioration compensator 220 may generate an alpha value ALPHA based on a ratio between a sensed current IREAD or IMEASURE read from a portion of the display panel 100 applied with the high power voltage ELVDD or a portion of the display panel 100 applied with the low power voltage ELVSS and a predicted current ISUM calculated from the input image data IMG. The deterioration compensator 220 may generate the data signal DATA using the input image data IMG, the stress value, and the alpha value ALPHA.

As shown in FIG. 2, the display apparatus may further include a readout circuit 800 (or RO) reading the sensed current IREAD from the portion applied with the low power voltage ELVSS. In the embodiment, the sensed current IREAD may be read from the portion applied with the low power voltage ELVSS.

According to an embodiment, the pixel of the display panel 100 may include a driving transistor DT, a light emitting element EE, and a storage capacitor CST.

The driving transistor DT may include a control electrode receiving a data voltage VDATA, a first electrode receiving the high power voltage ELVDD, and a second electrode connected to a first electrode of the light emitting element EE.

The light emitting element EE may include the first electrode connected to the second electrode of the driving transistor and a second electrode receiving the low power voltage ELVSS. The first electrode of the light emitting element EE may be an anode electrode. The second electrode of the light emitting element EE may be a cathode electrode. In an embodiment, the readout circuit 800 may be connected between the second electrode of the light emitting element EE and the low power voltage ELVSS.

The storage capacitor CST may include a first end receiving the high power voltage ELVDD and a second end connected to the control electrode of the driving transistor DT.

Although FIG. 2 illustrates that the driving transistor DT is a P-type transistor, the disclosure is not limited thereto. For example, the driving transistor DT may be an N-type transistor.

Although FIG. 2 illustrates that the pixel includes one transistor DT and one capacitor CST, the disclosure is not limited to thereto.

The driving controller 200 may further include a memory controller 240 outputting the stress value to the deterioration compensator 220.

The driving controller 200 may further include a stress converter 260 calculating the stress value STRESS based on at least one of a display luminance, a temperature, a current, and a voltage of the display panel 100.

The driving controller 200 may further include a volatile memory 280 accumulating the stress value STRESS calculated by the stress converter 260 and storing the stress value STRESS. For example, the volatile memory 280 may be a read only memory (RAM). For example, the volatile memory 280 may be a static read only memory (SRAM).

The display apparatus may further include a nonvolatile memory 700 accumulating the stress value STRESS calculated by the stress converter 260 and storing the stress value STRESS. For example, the nonvolatile memory 700 may be a flash memory.

The memory controller 240 may control the volatile memory 280 and the nonvolatile memory 700.

As shown in FIG. 4, a deterioration curve of a luminance (or brightness) corresponding to the stress value STRESS generated based on at least one of the display luminance, the temperature, the current, and the voltage of the display panel 100 may be modeled to compensate the deterioration. The modeled curve is represented as CM.

In FIG. 4, the luminance according to the stress value may be determined using the general deterioration curve CM, and the data signal DATA may be compensated to have a desired luminance accordingly.

For example, the deterioration compensator 220 may compensate a portion which is brighter than adjacent portions due to the deterioration to be darker. For example, the deterioration compensator 220 may compensate a portion which is darker than adjacent portions due to the deterioration to be brighter.

However, there may be variations in the deterioration curves between cells due to process variations. As shown in FIG. 5, a deterioration curve C1 of a first cell, a deterioration curve C2 of a second cell, and a deterioration curve C3 of a third cell may have deviations from each other.

Thus, in case that the luminance according to the stress value is determined using the general deterioration curve CM and the data signal DATA is compensated to have a desired luminance accordingly, a deterioration of a display panel in the first cell, a deterioration of a display panel in the second cell, and a deterioration of a display panel in the third cell may not be accurately compensated.

Therefore, in an embodiment, the alpha value ALPHA may be calculated based on the ratio between the sensed current IREAD or IMEASURE read from the portion of the display panel 100 applied with the high power voltage ELVDD or the portion of the display panel 100 applied with the low power voltage ELVSS and the predicted current ISUM calculated from the input image data IMG, and the data signal DATA may be generated using the input image data IMG, the stress value STRESS, and the alpha value ALPHA. According to the embodiment, the process deviation between the cells may be compensated using the sensed value and the predicted value.

As shown in FIG. 6, the deterioration compensator 220 may include an input current calculator 224 receiving the input image data IMG and generating the predicted current ISUM based on the input image data IMG. The predicted current ISUM may correspond to an entire area of the display panel 100. The predicted current ISUM may be a value not in a unit of the pixel P but in a unit of the display panel 100. In terms of time, the predicted current ISUM may be a value in a unit of a frame.

For example, in case that a red grayscale value of the input image data IMG is R_d_i, a green grayscale value of the input image data IMG is G_d_i, a blue grayscale value of the input image data IMG is B_d_i, a red conversion function converting the red grayscale value to a red luminance is R_Gam, a green conversion function converting the green grayscale value to a green luminance is G_Gam, a blue conversion function converting the blue grayscale value to a blue luminance is B_Gam, a first coefficient converting the red luminance to a first current is Kr, a second coefficient converting the green luminance to a second current is Kg, a third coefficient converting the blue luminance to a third current is Kb and the predicted current is ISUM, ISUM=SUM(Kr*R_Gam[R_d_i]+Kg*G_Gam[G_d_i]+Kb*B_Gam[B_d_i]) may be satisfied.

The deterioration compensator 220 may further include a reference current calculator 222 receiving the sensed current IREAD and generating a reference current IMEASURE based on the sensed current IREAD. The reference current IMEASURE may correspond to the entire area of the display panel 100. The reference current IMEASURE may be a value not in a unit of the pixel P but in a unit of the display panel 100. In terms of time, the reference current IMEASURE may be a value in a unit of the frame.

In an embodiment, the input current calculator 224 of the deterioration compensator 220 may generate the predicted current ISUM in every frame, and the reference current calculator 222 may generate the reference current IMEASURE in every frame.

In another embodiment, the deterioration compensation operation may be performed in a unit of time longer than a unit of the frame. For example, the deterioration compensation operation may be performed in a unit of a second, a unit of ten seconds, a unit of a minute, or a unit of ten minutes. In case that the deterioration compensation operation is performed in a unit of a second, a unit of ten seconds, a unit of a minute, or a unit of ten minutes, the reference current calculator 222 may generate the predicted current ISUM and the reference current IMEASURE in a unit of a second, a unit of ten seconds, a unit of a minute, or a unit of ten minutes.

For example, as a deterioration rate of the display panel 100 increases, an operation cycle of the deterioration compensator 220 may decrease. Comparing a first case in which a luminance of the display panel 100 drops by 10% after 100 hours and a second case in which the luminance of the display panel 100 drops by 10% after 10 hours, the deterioration compensator 220 may need to operate more frequently for the second case. Thus, as a deterioration rate of the display panel 100 increases, the operation cycle of the deterioration compensator 220 may be set shorter.

For example, in case that the sensed current is TREAD, the reference current is IMEASURE, and a fitting constant is K_read, IMEASURE=K_read*IREAD may be satisfied. TREAD which is sensed by the readout circuit 800 may be used as sensed, or may be compensated by a fitting constant. In an embodiment, the reference current IMEASURE may be generated by multiplying the sensed current TREAD by the fitting constant K_read.

The deterioration compensator 220 may further include a current compensating value calculator 226 receiving the predicted current ISUM and the reference current IMEASURE and generating the alpha value ALPHA based on a ratio between the predicted current ISUM and the reference current IMEASURE.

For example, in case that the reference current is IMEASURE, the predicted current is ISUM, a current compensating value lookup table is K_alpha_LUT, and the alpha value is ALPHA, ALPHA=K_alpha_LUT(IMEASURE/ISUM) may be satisfied.

The current compensating value lookup table K_alpha_LUT may receive the reference current IMEASURE and the predicted current ISUM and may output the alpha value ALPHA based on a ratio between the reference current IMEASURE and the predicted current ISUM. The ratio between the reference current IMEASURE and the predicted current ISUM may be appropriately processed by the current compensating value lookup table K_alpha_LUT to generate the alpha value ALPHA.

In the compensating value lookup table K_alpha_LUT, a relationship between the ratio between the reference current IMEASURE and the predicted current ISUM and the alpha value ALPHA may be set linearly or nonlinearly.

The deterioration compensator 220 may further include a compensation applier 228 receiving the stress value STRESS of the pixel and the alpha value ALPHA, generating a luminance compensating value of the pixel, and applying the luminance compensating value to the input image data IMG to generate the data signal DATA.

For example, in case that the alpha value is ALPHA, a red stress value is A_r_i, a green stress value is A_g_i, a blue stress value is A_b_i, a red luminance compensating value is Lr_comp_i, a green luminance compensating value is Lg_comp_i, a blue luminance compensating value is Lb_comp_i, a red luminance compensating lookup table is Lr_drop_LUT, a green luminance compensating lookup table is Lg_drop_LUT, and a blue luminance compensating lookup table is Lb_drop_LUT, Lr_comp_i=Lr_drop_LUT (A_r_i*ALPHA), Lg_comp_i=Lg_drop_LUT (A_g_i*ALPHA) and Lb_comp_i=Lb_drop_LUT (A_b_i*ALPHA) may be satisfied.

A product of the red stress value and the alpha value (A_r_i*ALPHA) may be a compensated stress value of the red pixel. In case that a luminance decrease due to the compensated stress value (A_r_i*ALPHA) of the red pixel is about 10%, a red luminance compensating lookup table Lr_drop_LUT may be set such that the red luminance compensating value Lr_comp_i is about 111%. The red luminance compensating lookup table Lr_drop_LUT may output the red luminance compensating value Lr_comp_i corresponding to the compensated stress value (A_r_i*ALPHA).

Similarly, the green luminance compensating lookup table Lg_drop_LUT may output the green luminance compensating value Lg_comp_i corresponding to the compensated stress value (A_g_i*ALPHA).

The blue luminance compensating lookup table Lb_drop_LUT may also output the blue luminance compensating value Lb_comp_i corresponding to the compensated stress value (A_b_i*ALPHA).

In case that the red grayscale value of the input image data IMG is R_d_i, the green grayscale value of the input image data IMG is G_d_i, the blue grayscale value of the input image data IMG is B_d_i, a red grayscale value of the data signal DATA is comp_data_r, a green grayscale value of the data signal DATA is comp_data_g, a blue grayscale value of the data signal DATA is comp_data_b, a red luminance-grayscale converting coefficient is scaler, a green luminance-grayscale converting coefficient is scale_g, and a blue luminance-grayscale converting coefficient is scale_b, comp_data_r=Lr_comp_i*R_d_i*scale_r, comp_data_g=Lg_comp_i*G_d_i*scale_g, and comp_data_b=Lb_comp_i*B_d_i*scale_b may be satisfied.

The red luminance compensating value Lr_comp_i, the green luminance compensating value Lg_comp_i, and the blue luminance compensating value Lb_comp_i may be in a luminance domain, the red grayscale value R_d_i, the green grayscale value G_d_i, and the blue grayscale value B_d_i may be in a grayscale domain, and the data signal DATA may be outputted in the grayscale domain so that the converting coefficients scale_r, scale_g, and scale_b for a luminance-grayscale conversion may be multiplied to the luminance compensating values Lr_comp_i, Lg_comp_i, and Lb_comp_i.

According to an embodiment, the deterioration of the display panel 100 may be compensated using the ratio between the sensed current TREAD or IMEASURE of the display panel and the predicted current ISUM of the display panel 100 predicted based on the input image data IMG so that the deterioration compensation error due to the variation between the cells may be reduced.

Thus, the accuracy of the deterioration compensation may be enhanced, and the display quality of the display panel 100 may be enhanced.

Figure 7:
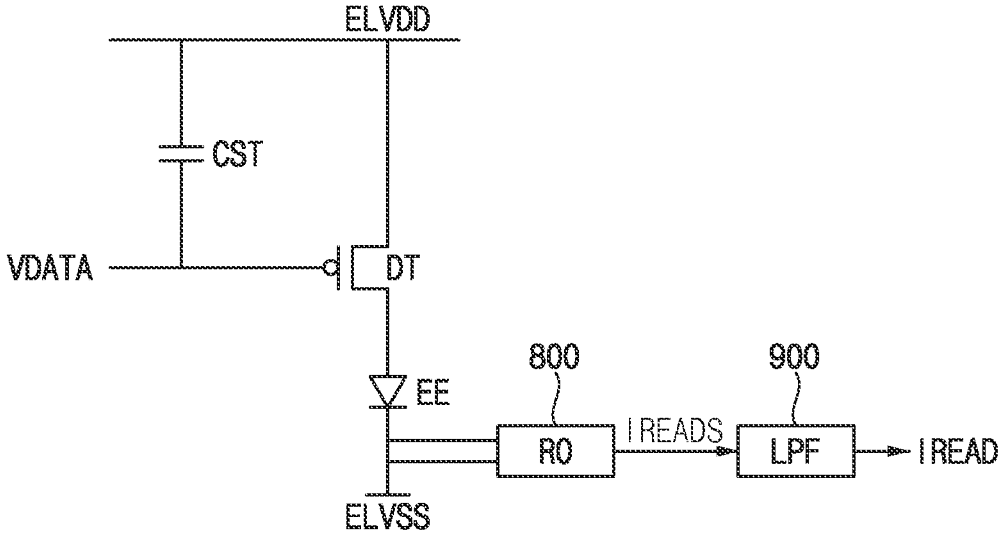
FIG. 7 is a schematic diagram of an equivalent circuit of a display panel, a readout circuit, and a low pass filter of a display apparatus according to an embodiment of the disclosure.

FIG. 7 is a schematic diagram of an equivalent circuit of a display panel 100, a readout circuit 800, and a low pass filter 900 of a display apparatus according to an embodiment of the disclosure.

The display apparatus and the method of compensating the deterioration of the display panel using the display apparatus according to the embodiment are substantially the same as the display apparatus and the method of compensating the deterioration of the display panel using the display apparatus of the embodiment explained referring to FIGS. 1 to 6 except that the display apparatus may further include a low pass filter 900 (or LPF). Thus, the same reference numerals will be used to refer the same or like parts as those described in the embodiment of FIGS. 1 to 6, and any repetitive explanation concerning the above elements will be omitted.

Referring to FIGS. 1 and 3 to 7, the display apparatus may include a display panel 100 and a display panel driver. The display panel driver may include a driving controller 200, a gate driver 300, a gamma reference voltage generator 400, and a data driver 500. The display panel driver may further include a power voltage generator 600. The display apparatus may further include a nonvolatile memory 700.

The driving controller 200 may include a deterioration compensator 220. The deterioration compensator 220 may generate a data signal DATA compensating the deterioration of the display panel 100.

The deterioration compensator 220 may generate an alpha value ALPHA based on a ratio between a sensed current IREAD or IMEASURE read from a portion of the display panel 100 applied with the high power voltage ELVDD or a portion of the display panel 100 applied with the low power voltage ELVSS and a predicted current ISUM calculated from the input image data IMG. The deterioration compensator 220 may generate a data signal DATA using the input image data IMG, the stress value STRESS, and the alpha value ALPHA.

As shown in FIG. 7, the display apparatus may further include a readout circuit 800 reading a sensing source current IREADS from the portion applied with the low power voltage ELVSS. In an embodiment, the sensing source current IREADS may be read from the portion applied with the low power voltage ELVSS.

In the embodiment, the display apparatus may further include a low pass filter 900 periodically sampling the sensing source current IREADS and operating a low pass filtering of the sensing source current IREADS to generate the sensed current IREAD. The low pass filter 900 may output the sensed current IREAD to the deterioration compensator 220. In an embodiment, the low pass filter 900 may periodically sample the sensing source current and determine a deterioration rate of the display panel. Although not shown in the drawings, the low pass filer 900 may send a signal to the deterioration compensator 200 in case that the deterioration rate is above a threshold.

In case that the sensing source current IREADS is sampled at a cycle (predetermined or selectable), the reference current calculator 222 and the input current calculator 224 of the deterioration compensator 220 may not need to operate every frame so that the power consumption of the display apparatus may be reduced. Herein, the cycle may be several seconds or several minutes.

In case that the sensing source current IREADS is low pass filtered, a noise of the sensed current IREAD may be reduced. For example, the low pass filtering may be averaging multiple sensing source currents IREADS.

The deterioration compensator 220 may include an input current calculator 224 receiving the input image data IMG and generating the predicted current ISUM based on the input image data IMG.

The deterioration compensator 220 may further include a reference current calculator 222 receiving the sensed current IREAD and generating a reference current IMEASURE based on the sensed current IREAD.

The deterioration compensator 220 may further include a current compensating value calculator 226 receiving the predicted current ISUM and the reference current IMEASURE and generating the alpha value ALPHA based on a ratio between the predicted current ISUM and the reference current IMEASURE.

The deterioration compensator 220 may further include a compensation applier 228 receiving the stress value STRESS of the pixel and the alpha value ALPHA, generating a luminance compensating value of the pixel, and applying the luminance compensating value to the input image data IMG to generate the data signal DATA.

According to an embodiment, the deterioration of the display panel 100 may be compensated using the ratio between the sensed current IREAD or IMEASURE of the display panel and the predicted current ISUM of the display panel 100 predicted based on the input image data IMG so that the deterioration compensation error due to the variation between the cells may be reduced.

Thus, the accuracy of the deterioration compensation may be enhanced, and the display quality of the display panel 100 may be enhanced.

Figure 8:
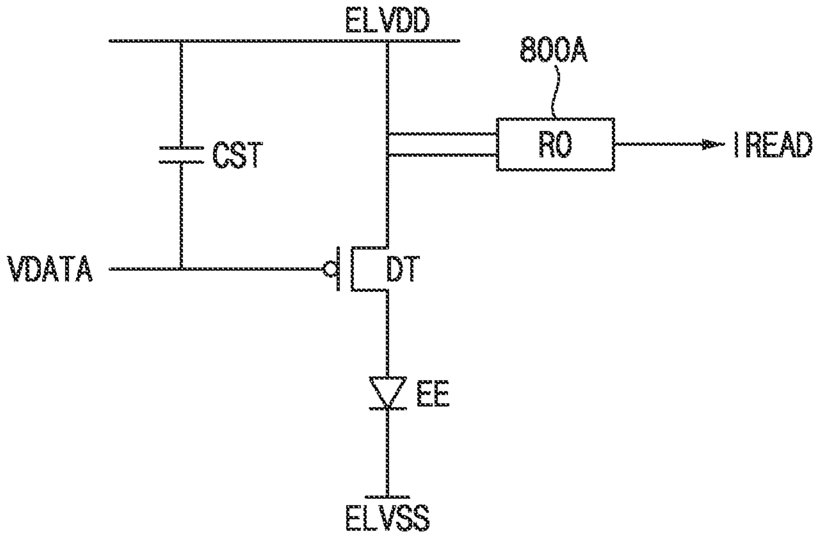
FIG. 8 is a schematic diagram of an equivalent circuit of a display panel and a readout circuit of a display apparatus according to an embodiment of the disclosure.

FIG. 8 is a schematic diagram of an equivalent circuit of a display panel 100 and a readout circuit 800A of a display apparatus according to an embodiment of the disclosure.

The display apparatus and the method of compensating the deterioration of the display panel using the display apparatus according to the embodiment are substantially the same as the display apparatus and the method of compensating the deterioration of the display panel using the display apparatus of the embodiment explained referring to FIGS. 1 to 6 except that the readout circuit 800A may be connected to a portion applied with a high power voltage. Thus, the same reference numerals will be used to refer the same or like parts as those described in the embodiment of FIGS. 1 to 6, and any repetitive explanation concerning the above elements will be omitted.

Referring to FIGS. 1, 3 to 6, and 8, the display apparatus may include a display panel 100 and a display panel driver. The display panel driver may include a driving controller 200, a gate driver 300, a gamma reference voltage generator 400, and a data driver 500. The display panel driver may further include a power voltage generator 600. The display apparatus may further include a nonvolatile memory 700.

The driving controller 200 may include a deterioration compensator 220. The deterioration compensator 220 may generate a data signal DATA compensating the deterioration of the display panel 100.

The deterioration compensator 220 may generate an alpha value ALPHA based on a ratio between a sensed current IREAD or IMEASURE read from a portion of the display panel 100 applied with the high power voltage ELVDD or a portion of the display panel 100 applied with the low power voltage ELVSS and a predicted current ISUM calculated from the input image data IMG. The deterioration compensator 220 may generate the data signal DATA using the input image data IMG, the stress value STRESS, and the alpha value ALPHA.

As shown in FIG. 8, the display apparatus may further include a readout circuit 800A (or RO) reading a sensed current IREAD from the portion applied with the high power voltage ELVDD. For example, the readout circuit 800A may be connected between the first electrode of the driving transistor DT and the high power voltage ELVDD. In an embodiment, the sensed current IREAD may be read from the portion applied with the high power voltage ELVDD.

The deterioration compensator 220 may include an input current calculator 224 receiving the input image data IMG and generating the predicted current ISUM based on the input image data IMG.

The deterioration compensator 220 may further include a reference current calculator 222 receiving the sensed current IREAD and generating a reference current IMEASURE based on the sensed current IREAD.

The deterioration compensator 220 may further include a current compensating value calculator 226 receiving the predicted current ISUM and the reference current IMEASURE and generating the alpha value ALPHA based on a ratio between the predicted current ISUM and the reference current IMEASURE.

The deterioration compensator 220 may further include a compensation applier 228 receiving the stress value STRESS of the pixel and the alpha value ALPHA, generating a luminance compensating value of the pixel, and applying the luminance compensating value to the input image data IMG to generate the data signal DATA.

According to the embodiment, the deterioration of the display panel 100 may be compensated using the ratio between the sensed current IREAD or IMEASURE of the display panel and the predicted current ISUM of the display panel 100 predicted based on the input image data IMG so that the deterioration compensation error due to the variation between the cells may be reduced.

Thus, the accuracy of the deterioration compensation may be enhanced, and the display quality of the display panel 100 may be enhanced.

Figure 9:
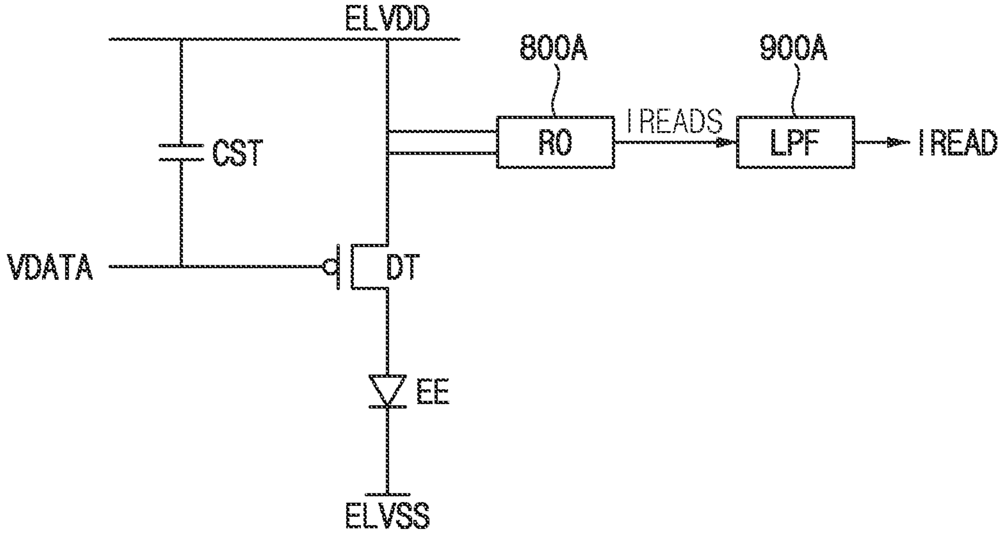
FIG. 9 is a schematic diagram of an equivalent circuit of a display panel, a readout circuit, and a low pass filter of a display apparatus according to an embodiment of the disclosure.

FIG. 9 is a schematic diagram of an equivalent circuit of a display panel 100, a readout circuit 800A, and a low pass filter 900A of a display apparatus according to an embodiment of the disclosure.

The display apparatus and the method of compensating the deterioration of the display panel using the display apparatus according to the embodiment are substantially the same as the display apparatus and the method of compensating the deterioration of the display panel using the display apparatus of the embodiment explained referring to FIGS. 1 to 6 except that the readout circuit 800A may be connected to a portion applied with a high power voltage and the display apparatus may further include a low pass filter 900A. Thus, the same reference numerals will be used to refer the same or like parts as those described in the embodiment of FIGS. 1 to 6 and any repetitive explanation concerning the above elements will be omitted.

Referring to FIGS. 1, 3 to 6, and 9, the display apparatus may include a display panel 100 and a display panel driver. The display panel driver may include a driving controller 200, a gate driver 300, a gamma reference voltage generator 400, and a data driver 500. The display panel driver may further include a power voltage generator 600. The display apparatus may further include a nonvolatile memory 700.

The driving controller 200 may include the deterioration compensator 220. The deterioration compensator 220 may generate a data signal DATA compensating the deterioration of the display panel 100.

The deterioration compensator 220 may generate an alpha value ALPHA based on a ratio between a sensed current IREAD or IMEASURE read from a portion of the display panel 100 applied with the high power voltage ELVDD or a portion of the display panel 100 applied with the low power voltage ELVSS and a predicted current ISUM calculated from the input image data IMG. The deterioration compensator 220 may generate the data signal DATA using the input image data IMG, the stress value STRESS, and the alpha value ALPHA.

As shown in FIG. 9, the display apparatus may further include a readout circuit 800A (or RO) reading a sensing source current IREADS from the portion applied with the high power voltage ELVDD. In an embodiment, the sensing source current IREADS may be read from the portion applied with the high power voltage ELVDD. For example, the readout circuit 800A may be connected between the first electrode of the driving transistor DT and the high power voltage.

In an embodiment, the display apparatus may further include a low pass filter 900A (or LPF) periodically sampling the sensing source current IREADS and operating a low pass filtering of the sensing source current IREADS to generate a sensed current IREAD. The low pass filter 900A may output the sensed current IREAD to the deterioration compensator 220. In an embodiment, the low pass filter 900A may periodically sample the sensing source current and determine a deterioration rate of the display panel. Although not shown in the drawings, the low pass filer 900A may send a signal to the deterioration compensator 200 in case that the deterioration rate is above a threshold.

In case that the sensing source current IREADS is sampled at a cycle (predetermined or selectable), the reference current calculator 222 and the input current calculator 224 of the deterioration compensator 220 may not need to operate every frame so that the power consumption of the display apparatus may be reduced. Herein, the cycle may be several seconds or several minutes.

In case that the sensing source current IREADS is low pass filtered, a noise of the sensed current IREAD may be reduced. For example, the low pass filtering may be averaging multiple sensing source currents IREADS.

The deterioration compensator 220 may include an input current calculator 224 receiving the input image data IMG and generating the predicted current ISUM based on the input image data IMG.

The deterioration compensator 220 may further include a reference current calculator 222 receiving the sensed current IREAD and generating a reference current IMEASURE based on the sensed current IREAD.

The deterioration compensator 220 may further include a current compensating value calculator 226 receiving the predicted current ISUM and the reference current IMEASURE and generating the alpha value ALPHA based on a ratio between the predicted current ISUM and the reference current IMEASURE.

The deterioration compensator 220 may further include a compensation applier 228 receiving a stress value STRESS of the pixel and the alpha value ALPHA, generating a luminance compensating value of the pixel and applying the luminance compensating value to the input image data IMG to generate the data signal DATA.

According to the embodiment, the deterioration of the display panel 100 may be compensated using the ratio between the sensed current IREAD or IMEASURE of the display panel and the predicted current ISUM of the display panel 100 predicted based on the input image data IMG so that the deterioration compensation error due to the variation between the cells may be reduced.

Thus, the accuracy of the deterioration compensation may be enhanced, and the display quality of the display panel 100 may be enhanced.

Figure 10:
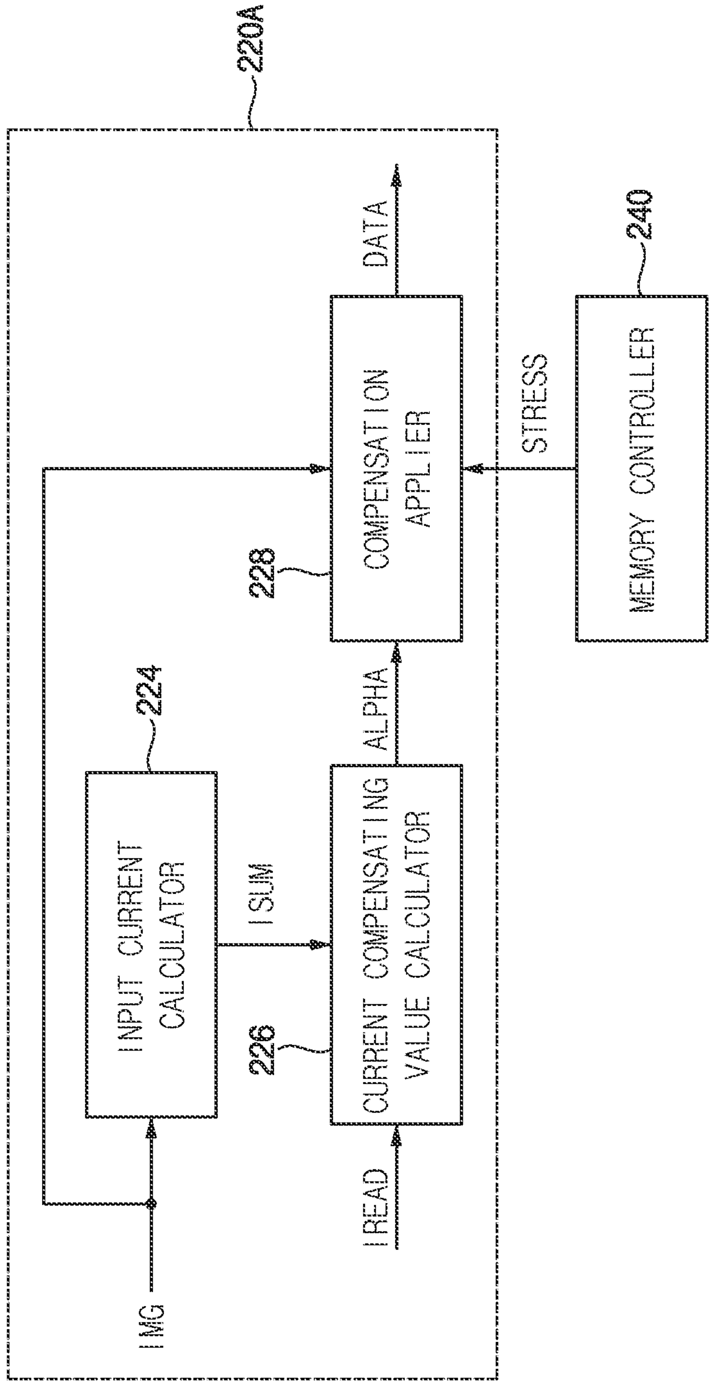
FIG. 10 is a schematic diagram illustrating a deterioration compensator and a memory controller of a display apparatus according to an embodiment of the disclosure.

FIG. 10 is a schematic diagram illustrating a deterioration compensator 220A and a memory controller 240 of a display apparatus according to an embodiment of the disclosure.

The display apparatus and the method of compensating the deterioration of the display panel using the display apparatus according to the embodiment are substantially the same as the display apparatus and the method of compensating the deterioration of the display panel using the display apparatus of the embodiment explained referring to FIGS. 1 to 6 except that the deterioration compensator 220A may not include the reference current calculator 222 in FIG. 6. Thus, the same reference numerals will be used to refer the same or like parts as those described in the embodiment of FIGS. 1 to 6, and any repetitive explanation concerning the above elements will be omitted.

Referring to FIGS. 1 to 5 and 10, the display apparatus may include a display panel 100 and a display panel driver. The display panel driver may include a driving controller 200, a gate driver 300, a gamma reference voltage generator 400, and a data driver 500. The display panel driver may further include a power voltage generator 600. The display apparatus may further include a nonvolatile memory 700.

The driving controller 200 may include a deterioration compensator 220A. The deterioration compensator 220A may generate a data signal DATA compensating the deterioration of the display panel 100.

The deterioration compensator 220A may generate an alpha value ALPHA based on a ratio between a sensed current IREAD or IMEASURE read from a portion of the display panel 100 applied with the high power voltage ELVDD or a portion of the display panel 100 applied with the low power voltage ELVSS and a predicted current ISUM calculated from the input image data IMG. The deterioration compensator 220 may generate the data signal DATA using the alpha value ALPHA.

The deterioration compensator 220A may include an input current calculator 224 receiving the input image data IMG and generating the predicted current ISUM based on the input image data IMG.

The deterioration compensator 220A may further include a current compensating value calculator 226 receiving the predicted current ISUM and the sensed current IREAD and generating the alpha value ALPHA based on a ratio between the predicted current ISUM and the sensed current IREAD.

In the embodiment, the deterioration compensator 220A may not include the reference current calculator 222 in FIG. 6 which generates the reference current IMEASURE based on the sensed current IREAD. The current compensating value calculator 226 may generate the alpha value ALPHA based on the ratio between the predicted current ISUM and the sensed current IREAD.

The deterioration compensator 220A may further include a compensation applier 228 receiving the stress value STRESS of the pixel and the alpha value ALPHA, generating a luminance compensating value of the pixel and applying the luminance compensating value to the input image data IMG to generate the data signal DATA.

According to the embodiment, the deterioration of the display panel 100 may be compensated using the ratio between the sensed current IREAD of the display panel and the predicted current ISUM of the display panel 100 predicted based on the input image data IMG so that the deterioration compensation error due to the variation between the cells may be reduced.

Thus, the accuracy of the deterioration compensation may be enhanced, and the display quality of the display panel 100 may be enhanced.

Figure 11:
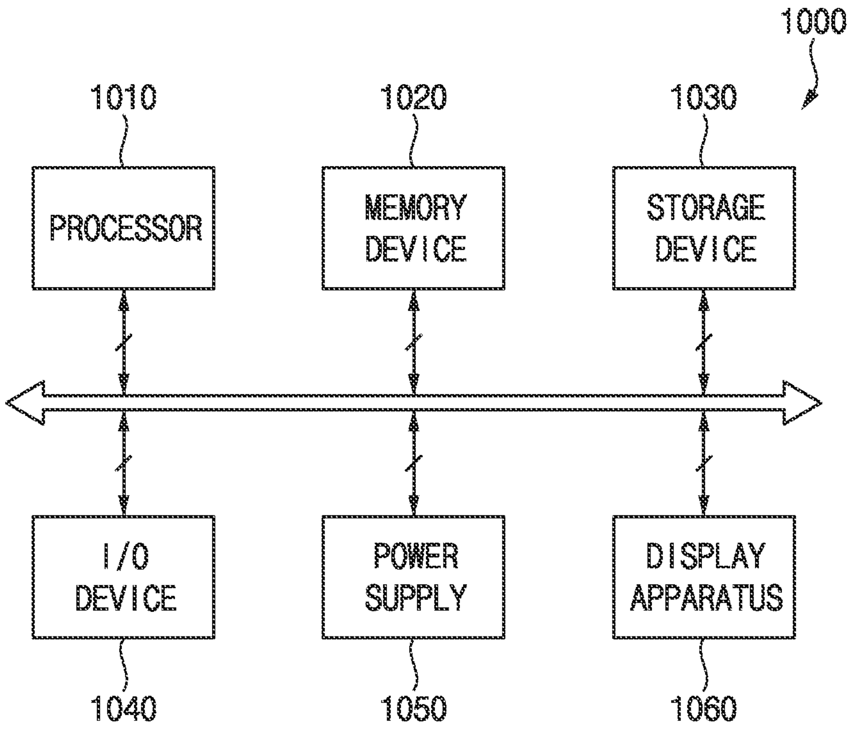
FIG. 11 is a schematic block diagram illustrating an electronic apparatus according to an embodiment of the disclosure.
Figure 12:
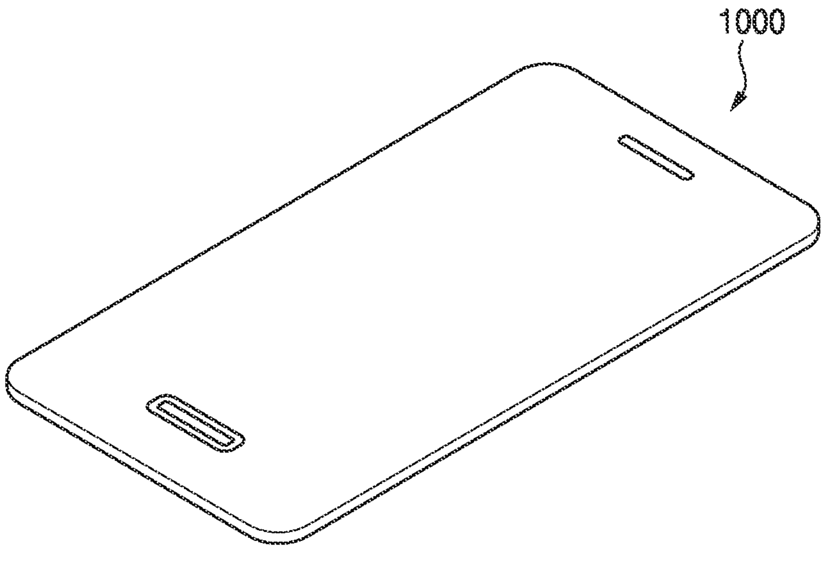
FIG. 12 is a schematic diagram illustrating the electronic apparatus of FIG. 11 implemented as a smart phone according to an embodiment of the disclosure.

FIG. 11 is a schematic block diagram illustrating an electronic apparatus according to an embodiment of the disclosure. FIG. 12 is a schematic diagram illustrating the electronic apparatus of FIG. 11 implemented as a smart phone according to an embodiment of the disclosure.

Referring to FIGS. 11 and 12, the electronic apparatus 1000 may include a processor 1010, a memory device 1020, a storage device 1030, an input/output (I/O) device 1040, a power supply 1050, and a display apparatus 1060. The display apparatus 1060 may be the display apparatus of FIG. 1 and the memory device 1020 may be the nonvolatile memory 700 of FIG. 1. The electronic apparatus 1000 may further include multiple ports for communicating with a video card, a sound card, a memory card, a universal serial bus (USB) device, other electronic apparatuses, etc.

In an embodiment, as illustrated in FIG. 12, the electronic apparatus 1000 may be implemented as a smart phone. However, the electronic apparatus 1000 is not limited thereto. For example, the electronic apparatus 1000 may be implemented as a cellular phone, a video phone, a smart pad, a smart watch, a tablet PC, a car navigation system, a computer monitor, a laptop, a head mounted display (TIMID) device, or the like.

The processor 1010 may perform various computing functions or various tasks. The processor 1010 may be a micro-processor, a central processing unit (CPU), an application processor (AP), or the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT to the driving controller 200 of FIG. 1.

The memory device 1020 may store data for operations of the electronic apparatus 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, or the like. The I/O device 1040 may include an input device such as a keyboard, a keypad, a mouse device, a touch-pad, a touch-screen, or the like and an output device such as a printer, a speaker, or the like. In embodiments, the display apparatus 1060 may be included in the I/O device 1040. The power supply 1050 may provide power for operations of the electronic apparatus 1000. The display apparatus 1060 may be coupled to other components via buses or other communication links.

According to the embodiments of the display apparatus and the method of compensating the deterioration of the display panel, the accuracy of the deterioration compensation may be enhanced, and the display quality of the display panel may be enhanced.

The above description is an example of technical features of the disclosure, and those skilled in the art to which the disclosure pertains will be able to make various modifications and variations. Thus, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A display apparatus comprising:

a display panel;

a driving controller that generates a data signal based on input image data; and a data driver that converts the data signal into a data voltage and outputs the data voltage to the display panel, wherein the driving controller comprises a deterioration compensator, and the deterioration compensator generates an alpha value based on a ratio between a sensed current read from a portion of the display panel applied with a high power voltage or a portion of the display panel applied with a low power voltage and a predicted current calculated from the input image data and generates the data signal using the input image data, a stress value of a pixel, and the alpha value.

2. The display apparatus of claim 1, wherein the driving controller further comprises:

a memory controller that outputs the stress value to the deterioration compensator; and a stress converter that calculates the stress value based on at least one of a display luminance, a temperature, a current, and a voltage of the display panel.

3. The display apparatus of claim 2, wherein the driving controller further comprises:

a volatile memory that accumulates the stress value calculated by the stress converter and stores the stress value.

4. The display apparatus of claim 3, further comprising:

a nonvolatile memory that accumulates the stress value calculated by the stress converter and stores the stress value.

5. The display apparatus of claim 1, wherein the deterioration compensator comprises an input current calculator that receives the input image data and generates the predicted current based on the input image data, and the predicted current corresponds to an entire area of the display panel.

6. The display apparatus of claim 5, wherein in case that a red grayscale value of the input image data is R_d_i, a green grayscale value of the input image data is G_d_i, a blue grayscale value of the input image data is B_d_i, a red conversion function converting the red grayscale value to a red luminance is R_Gam, a green conversion function converting the green grayscale value to a green luminance is G_Gam, a blue conversion function converting the blue grayscale value to a blue luminance is B_Gam, a first coefficient converting the red luminance to a first current is Kr, a second coefficient converting the green luminance to a second current is Kg, a third coefficient converting the blue luminance to a third current is Kb, and the predicted current is ISUM, ISUM=SUM(Kr*R_Gam[R_d_i]+Kg*G_Gam[G_d_i]+Kb*B_Gam[B_d_i]) is satisfied.

7. The display apparatus of claim 5, wherein the deterioration compensator further comprises a reference current calculator that receives the sensed current and generates a reference current based on the sensed current, and the reference current corresponds to the entire area of the display panel.

8. The display apparatus of claim 7, wherein in case that the sensed current is TREAD, the reference current is IMEASURE, and a fitting constant is K_read, IMEASURE=K_read*IREAD is satisfied.

9. The display apparatus of claim 7, wherein the deterioration compensator further comprises a current compensating value calculator that receives the predicted current and the reference current and generates the alpha value based on a ratio between the predicted current and the reference current.

10. The display apparatus of claim 9, wherein in case that the reference current is IMEASURE, the predicted current is ISUM, a current compensating value lookup table is K_alpha_LUT, and the alpha value is ALPHA, ALPHA=K_alpha_LUT(IMEASURE/ISUM) is satisfied.

11. The display apparatus of claim 9, wherein the deterioration compensator further comprises a compensation applier that receives the stress value of the pixel and the alpha value, generates a luminance compensating value of the pixel, and applies the luminance compensating value to the input image data to generate the data signal.

12. The display apparatus of claim 11, wherein in case that the alpha value is ALPHA, a red stress value is A_r_i, a green stress value is A_g_i, a blue stress value is A_b_i, a red luminance compensating value is Lr_comp_i, a green luminance compensating value is Lg_comp_i, a blue luminance compensating value is Lb_comp_i, a red luminance compensating lookup table is Lr_drop_LUT, a green luminance compensating lookup table is Lg_drop_LUT, and a blue luminance compensating lookup table is Lb_drop_LUT, Lr_comp_i=Lr_drop_LUT(A_r_i*ALPHA) is satisfied, Lg_comp_i=Lg_drop_LUT(A_g_i*ALPHA) is satisfied, and Lb_comp_i=Lb_drop_LUT(A_b_i*ALPHA) is satisfied.

13. The display apparatus of claim 12, wherein in case that a red grayscale value of the input image data is R_d_i, a green grayscale value of the input image data is G_d_i, a blue grayscale value of the input image data is B_d_i, a red grayscale value of the data signal is comp_data_r, a green grayscale value of the data signal is comp_data_g, a blue grayscale value of the data signal is comp_data_b, a red luminance-grayscale converting coefficient is scale_r, a green luminance-grayscale converting coefficient is scale_g, and a blue luminance-grayscale converting coefficient is scale_b, comp_data_r=Lr_comp_i*R_d_i*scale_r is satisfied, comp_data_g=Lg_comp_i*G_d_i*scale_g is satisfied, and comp_data_b=Lb_comp_i*B_d_i*scale_b is satisfied.

14. The display apparatus of claim 5, wherein the deterioration compensator further comprises a current compensating value calculator that receives the predicted current and the sensed current and generates the alpha value based on the ratio between the predicted current and the sensed current.

15. The display apparatus of claim 1, further comprising:

a power voltage generator that outputs the high power voltage and the low power voltage to the display panel; and a readout circuit that reads the sensed current from the portion of the display panel applied with the low power voltage.

16. The display apparatus of claim 1, further comprising:

a power voltage generator that outputs the high power voltage and the low power voltage to the display panel;

a readout circuit that reads a sensing source current from the portion of the display panel applied with the low power voltage; and a low pass filter that periodically samples the sensing source current and operates a low pass filtering of the sensing source current to generate the sensed current.

17. The display apparatus of claim 1, further comprising:

a power voltage generator that outputs the high power voltage and the low power voltage to the display panel; and a readout circuit that reads the sensed current from the portion of the display panel applied with the high power voltage.

18. The display apparatus of claim 1, further comprising:

a power voltage generator that outputs the high power voltage and the low power voltage to the display panel;

a readout circuit that reads a sensing source current from the portion of the display panel applied with the high power voltage; and a low pass filter that periodically samples the sensing source current and operates a low pass filtering of the sensing source current to generate the sensed current.

19. The display apparatus of claim 1, wherein as a deterioration rate of the display panel increases, an operation cycle of the deterioration compensator decreases.

20. A method of compensating a deterioration of a display panel, the method comprising:

calculating a stress value of the display panel based on at least one of a display luminance, a temperature, a current, and a voltage of the display panel;

generating a predicted current corresponding to an entire area of the display panel based on input image data;

reading a sensed current from a portion of the display panel applied with a high power voltage or a portion of the display panel applied with a low power voltage;

generating an alpha value based on a ratio between the sensed current and the predicted current; and generating a data signal using the input image data, the stress value, and the alpha value.

* * * * *